Patented July 25, 1933

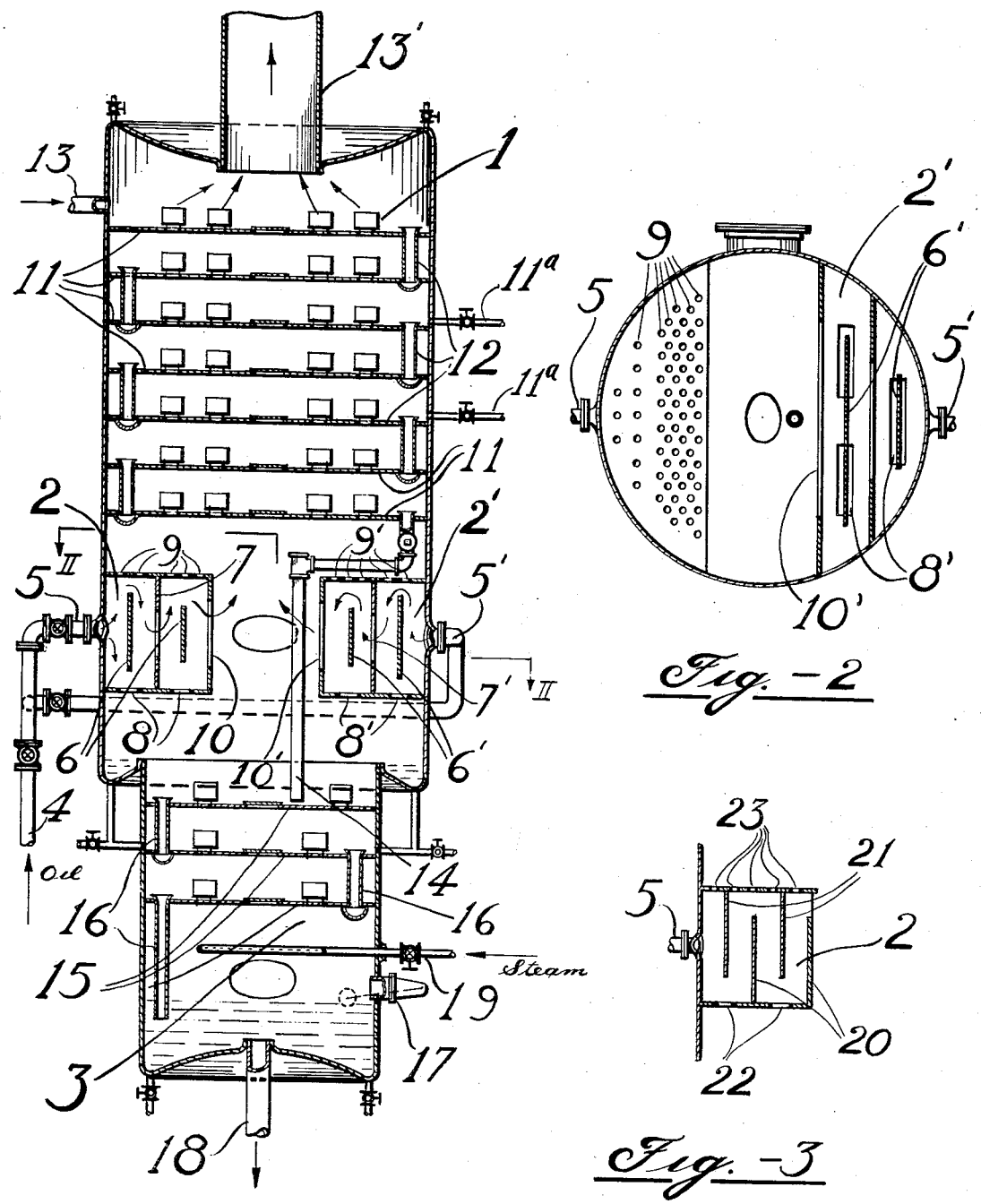

1,919,599

UNITED STATES PATENT OFFICE

JACKSON R. SCHONBERG, OF WESTFIELD, NEW JERSEY, ASSIGNOR TO STANDARD OIL DEVELOPMENT COMPANY, A CORPORATION OF DELAWARE

METHOD FOR REMOVING ENTRAINED LIQUID FROM GASES AND VAPORS

Application filed October 17, 1929. Serial No. 400,199.

This invention relates to the distillation of oils and apparatus therefor and more specifically comprises an improved process whereby distillates may be obtained free from mechanically entrained residual impurities.

The invention will be fully understood from the following description in conjunction with the drawing, in which Fig. 1 represents a vertical diagrammatic section through the preferred form of apparatus;

Fig. 2 is a cross section along the line II—II of Fig. 1; and,

Fig. 3 shows a modified form of chamber 2 of Fig. 1.

In the distillation of liquids such as oils difficulty is often experienced due to the mechanical entrainment of liquid particles. When, for instance, the distillation is carried out in a pipe still, the oil is brought up to the required temperature in heating tubes and then discharged into a separator or fractionating tower. Vaporization usually takes place both in the tubes and in the separator or tower at the time of discharge. The high velocity at which the hot fluid is discharged causes the gases and the vapors to carry along particles of the unvaporized residue. These particles would not be entrained if the linear velocity of the hot fluid could be decreased, before the discharge, to the value of the average linear vapor velocity obtaining in the tower. It is important to free the gases and vapors from the entrainment since otherwise the distillate will be contaminated with residue and its color and other characteristics will not meet the requirements.

I have discovered that a good separation of the entrained liquid from the vapors and gases is obtained by the combination of the following steps: (1) the liquid and vapor-gas mixture is discharged into an enlarged zone in which the bulk of the unvaporized residue separates out and is removed; (2) the vapors are forced to follow a tortuous path providing sudden changes in the direction of flow whereby entrained liquid particles are separated; (3) the liquid is removed from the zone as soon as separated; (4) part of the vapors is removed along the tortuous path without coming in contact with separated liquid and is united with the bulk of the vapors leaving the enlarged zone. It is seen that in this arrangement the separated liquid does not travel along with the vapors but is quickly removed, that the vapors do not come in contact with liquid during their removal, and further, that the pressure inside and outside the entrainment remover tends to become equalized by allowing part of the vapors to escape along the tortuous path.

In carrying out this method, the entrainment removing device is preferably built integral with the bubble tower, separator or the like, and consists of a chamber with vertically arranged baffles such as "discs and doughnuts," and openings such as slots in the bottom and holes in the top of the chamber. The bottom slots having a large area serve for the removal of separated liquid, while the top holes have a smaller area and serve for the partial removal of the vapors along the tortuous path, thus tending to equalize the pressure inside and outside the entrainment remover. To simplify the mechanical construction, I prefer to build the entrainment remover in two sections with separate feed inlets and use plane plates instead of cylindrical ones for the discs and doughnuts as it will be understood in the course of the description of the apparatus. (See especially Fig. 2.)

Fig. 1 represents a bubble tower comprising a rectifying section 1, entrainment remover in two symmetrical sections 2, 2', and a stripping section, 3. The hot feed coming from the pipe still (not shown) is discharged through lines 4, 5 and 5' into the two sections of the entrainment remover. The discs 6, 6' and doughnuts 7, 7' are arranged alternately so as to provide a tortuous path for the vapors. Bottom slots 8, 8' serve for the removal of the unvaporized liquid and separated entrainment, while the smaller top holes 9, 9' are provided for the partial escape of the vapors. The bulk of the vapors and gases leaves the entrainment remover through the wide openings 10 and 10'.

The rectifying section 1 is of the usual construction, having rectifying plates 11 provided with bell-caps, and reflux lines 12. Partial condensation is caused either by the introduction of a colder liquid through line 13 into the rectifying section or by any other means known in the art. The uncondensed gases and vapors are discharged by the outlet line 13' while the refluxed liquid products are led from the bottom plate by line 14 to the top plate of the stripping section where they commingle with the liquid products from the entrainment separator. Liquid products may be withdrawn from the rectifying section at any chosen plate or plates through valved lines 11a. The provision of the closed path 14 for the transfer of the reflux prevents the latter from coming in contact with vapors from the chambers 2, 2' whereby the possibility of causing fresh entrainment of liquid particles is eliminated. The stripping section 3 contains, similarly to section 1, several rectifying plates 15 and reflux lines 16. A float indicator 17 serves to show the height of the liquid level at the bottom of section 3, the bottoms being discharged through line 18. Steam is introduced through line 19 to remove any light products from the bottoms passing over the three stripping plates.

The tower illustrated in Fig. 1 provides a very efficient separation of the bottoms from the distillate and for this reason, it may be advantageously used in the vacuum distillation of crude residua, topped crudes, etc., to produce asphalt as bottoms, and lubricating oils and gas oil as distillate. In actual practice, large scale plants built according to the present invention will work very satisfactorily and give lubricating oil and gas oil fractions essentially free from entrained asphalt particles.

The entrainment separator may be used not only in connection with a bubble tower, but also with less efficient fractionating means, such as a separator tower which contains discs and doughnuts instead of the rectifying plates provided with bell-caps.

Figure 3 shows a modified form of section 2 of my entrainment separator. In this form there are no doughnuts provided, but only bottom disc plates 20 and top disc plates 21. Wide bottom slots 22 and small top holes 23 are provided for the removal of liquid and vapors respectively.

According to another modification, the two sections 2 and 2' of the entrainment remover may be built into one section with cylindrical plates serving as discs and doughnuts.

Still other modifications will be obvious to those skilled in the art and lie within the scope of the present invention.

I claim:
1. The method of distillation which comprises discharging a mixture of hot vapor and liquid at a vaporizing temperature into an entrainment removing zone in which the direction of flow undergoes sudden changes whereby liquid is separated, removing said liquid as soon as separated into a stripping zone, removing part of the vapors during their flow through the entrainment removing zone into a rectifying zone, discharging the remaining vapors into said rectifying zone and combining them with the vapors previously removed from the entrainment removing zone, passing the combined vapors through the rectifying zone whereby they are separated into a condensate and uncondensed vapors, passing the condensate through a closed path into the stripping zone and combining same with the liquid removed from the entrainment removing zone, introducing steam into the stripping zone whereby vapors are removed from the combined liquid, and commingling the last named vapors with vapors removed from the entrainment zone.

2. A method of separating entrained liquid particles from vapors or gases, which comprises passing the vapors or gases into and through a separating zone maintained in an intermediate portion of a distillation zone, said separating zone having an inlet and an outlet and in which the direction of flow undergoes sudden changes, whereby liquid particles are separated and removed to a lower part of the distillation zone to prevent their flow through the separating zone, removing part of the vapors during their flow through the separating zone to the upper part of the distillation zone, discharging the remaining vapors into said intermediate portion of the distillation zone and separately withdrawing vapors and liquids from the distillation zone.

JACKSON R. SCHONBERG.